1
United States Patent
Amkraut et al.

(10) Patent No.: US 9,355,500 B2
(45) Date of Patent: May 31, 2016

(54) SYSTEM AND METHOD FOR ANIMATING COLLISION-FREE SEQUENCES OF MOTIONS FOR OBJECTS PLACED ACROSS A SURFACE

(75) Inventors: Susan Amkraut, Palo Alto, CA (US); Michael Girard, Palo Alto, CA (US)

(73) Assignee: AUTODESK, INC., San Rafael, CA (US)

( * ) Notice: Subject to any disclaimer, the term of this patent is extended or adjusted under 35 U.S.C. 154(b) by 794 days.

(21) Appl. No.: 13/563,547

(22) Filed: Jul. 31, 2012

(65) Prior Publication Data

US 2013/0033501 A1    Feb. 7, 2013

Related U.S. Application Data

(60) Provisional application No. 61/513,985, filed on Aug. 1, 2011.

(51) Int. Cl.
G06T 19/20    (2011.01)

(52) U.S. Cl.
CPC ............. G06T 19/20 (2013.01); *G06T 2210/21* (2013.01); *G06T 2219/2004* (2013.01)

(58) Field of Classification Search
None
See application file for complete search history.

(56) References Cited

U.S. PATENT DOCUMENTS

2003/0184603 A1 * 10/2003 Marshall et al. ............ 345/958
2009/0306946 A1    12/2009 Badler et al.
2010/0091018 A1    4/2010 Tatarchuk et al.
2010/0134500 A1    6/2010 Chang
2010/0141666 A1    6/2010 Christopher et al.
2010/0299065 A1    11/2010 Mays
2010/0301555 A1    12/2010 Jubinville et al.
2011/0161060 A1    6/2011 Kim et al.

OTHER PUBLICATIONS

Non-final Office Action, U.S. Appl. No. 13/556,096, dated Sep. 26, 2014.
Non-final Office Action, U.S. Appl. No. 13/563,576, dated Apr. 16, 2014.
Non-final Office Action, U.S. Appl. No. 13/562,183, dated Apr. 24, 2014.
Reynolds C. W.: Flocks, herds, and schools: A distributed behavioral model. Proc. SIGGRAPH 87, Computer Graphics 21, 4 (Jul. 1987), 25-34.
Shao W., Terzopoulos D.: Autonomous pedestrians., In Proc. Symposium on Computer Animation (2005), pp. 19-28.

(Continued)

*Primary Examiner* — Maurice L McDowell, Jr.
(74) *Attorney, Agent, or Firm* — Artegis Law Group, LLP

(57) ABSTRACT

Embodiments of the invention set forth a technique for animating objects placed across a surface of a graphics object. A CAD application receives a set of motions and initially applies a different motion in the set of motions to each object placed across the surface of the graphics object. The CAD application calculates bounding areas of each object according to the current motion applied thereto, which are subsequently used by the CAD application to identify collisions that are occurring or will occur between the objects. Identified collisions are cured by identifying valid motions in the set of motions that can be applied to a colliding object and then calculating bounding areas for the valid motions to select a valid motion that, when applied to the object, does not cause the object to collide with any other objects.

20 Claims, 6 Drawing Sheets

(56) References Cited

OTHER PUBLICATIONS

Lee K. H., Choi M. G., Hong Q., Lee J.: Group behavior from video: a data-driven approach to crowd simulation, Proceedings of the 2007 ACM SIGGRAPH/Eurographics symposium on Computer animation, pp. 109-118.
Guy S. J., Chhugani J., Curtis S., Lin M. C., Dubey P., Manocha D.: Pledestrians: A least-effort approach to crowd simulation. In Symposium on Computer Animation (2010), ACM.
Van Den Berg J., Patil S., Sewall J., Manocha D., Lin M.: Interactive navigation of individual agents in crowded environments. Proc. of ACM Symposium on I3D (2008), 139-147.
Treuille A., Cooper S., Popovic Z.: Continuum crowds. Proc. of ACM SIGGRAPH (2006), 1160-1168.
Chenney S.: Flow tiles. Proc. 2004 ACM SIGGRAPH / Eurographics Symposium on Computer Animation (2004).
Guy S., Chhugani J., Kim C., Satish N., Lin, M. C., Manocha D., Dubey P.: Clearpath: Highly parallel collision avoidance for multi-agent simulation. Proc. of Symposium on Computer Animation (2009), 177-187.
Helbing D., Molnar P.: Social force model for pedestrian dynamics. Physical Review E 51 (May 1995), 4282.
Julien Pettré, Jan Ondřej, Anne-Hélène Olivier, Armel Crétual and Stéphane Donikian , Experiment-based Modeling, Simulation and Validation of Interactions between Virtual Walkers, Proceedings of the 2009 ACM SIGGRAPH/ Eurographics Symposium on Computer Animation (SCA'09), 2009.
Jan Ondřej, Julien Pettré, Anne-Hélène Olivier and Stéphane Donikian, A Synthetic-Vision-Based Steering Approach for Crowd Simulation SIGGRAPH '10: ACM SIGGRAPH 2010 Papers, 2010.
Manfred Lau and James Kuffner. 2006. Precomputed Search Trees: Planning for Interactive Goal-Driven Animation: ACM SIGGRAPH / Eurographics Symposium on Computer Animation (SCA), 299-308.
Ulicny, B., Ciechomski, O., and Thalmann, D. 2004. Crowdbrush: Interactive authoring of real-time crowd scenes. In Proceedings of the 2004 ACM SIGGRAPH/Eurographics symposium on Computer animation, 243-252.
Sung, M., Gleicher, M., and Chenney, S. 2004. Scalable behaviors for crowd simulation. Computer Graphics Forum 23, 3, 519-528.
Mankyu Sung and Lucas Kovar and Michael Gleicher, 2005, Fast and accurate goal-directed motion synthesis for crowds, Proceedings of the 2005 ACM SIGGRAPH/Eurographics symposium on Computer animation.
Ju E., Choi M. G., Park M., Lee J., Lee K. H., Takahashi S.: Morphable crowds. ACM Trans. Graph. 29, 6 (2010), 140.

\* cited by examiner

SYSTEM AND METHOD FOR ANIMATING COLLISION-FREE SEQUENCES OF MOTIONS FOR OBJECTS PLACED ACROSS A SURFACE

CROSS-REFERENCE TO RELATED APPLICATIONS

This application claims the priority benefit of Provisional U.S. Patent Application Ser. No. 61/513,985, filed Aug. 1, 2011, entitled "Crowd Simulation with Object Avoidance," the subject matter of which is hereby incorporated herein by reference.

BACKGROUND OF THE INVENTION

1. Field of the Invention

The invention relates generally to the field of crowd simulation in computer software and, more specifically, to animating collision-free sequences of motions for objects placed across a surface of a graphics object.

2. Description of the Related Art

Crowd simulation is the process of simulating a crowd having a large number of objects placed within a computer-generated crowd area. Typically, a graphics designer places the objects within the crowd area via manual selection of a different location onto which each object should be placed. The graphics designer is then faced with the task of animating each of the objects so that they behave and interact with one another in a natural manner. According to conventional approaches, the graphics designer selects each object and then applies a particular animation to the object, e.g., a guard standing post at an entrance. However, manual application of animations creates a variety of problems that are exacerbated as the number of objects placed within the crowd area increases.

One problem is that the graphics designer must ensure that the objects, when animated according to the animation applied thereto, do not collide with one another. The graphics designer must also ensure that the animated objects behave in a diversified manner in order to promote a natural feeling to the crowd area, which is especially difficult when working with long animations that include a number of different behaviors. These types of issues require the graphics designer to make a large number of passes through the animation and continuously fine-tune the animations of each object. What results is a tedious and cumbersome process for the graphics designer.

As the foregoing illustrates, what is needed in the art is an improved technique for animating objects within a crowd area in computer-generated crowd simulation.

SUMMARY OF THE INVENTION

One embodiment of the invention sets forth a method for animating, in a computer-generated simulation, a plurality of objects that are placed across a surface of a graphics object. The method includes the steps of receiving a specification of a total amount of time for the computer-generated simulation to execute, applying, to a first object in the plurality of objects, a first motion from a set of motions, wherein the first motion causes the first object to be animated for a first amount of time, applying, to a second object in the plurality of objects, a second motion from the set of motions, wherein the second motion causes the second object to be animated for a second amount of time, establishing, for the first object, a first bounding area that represents a largest area covered by the first object when animated by the first motion, establishing, for the second object, a second bounding area that represents a largest area covered by the second object when animated by the second motion, determining that the first motion terminates prior to the total amount of time for the computer-generated simulation and prior to the second amount of time, identifying a third motion in the set of motions that is a valid motion to be applied to the first object, establishing a third bounding area for the first object based on the third motion, determining that the third bounding area does not intersect with the second bounding area of the second object, and scheduling the third motion to be applied to the first object when the first motion terminates.

One advantage of the disclosed technique is that the cumbersome manual selection process of applying different motions to objects in a computer-generated crowd simulation is eliminated. Instead, the disclosed technique provides a method for automatically animating a plurality of objects in a diverse manner while preventing those objects from colliding with one another at any time during the duration of the computer-generated crowd simulation.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1:
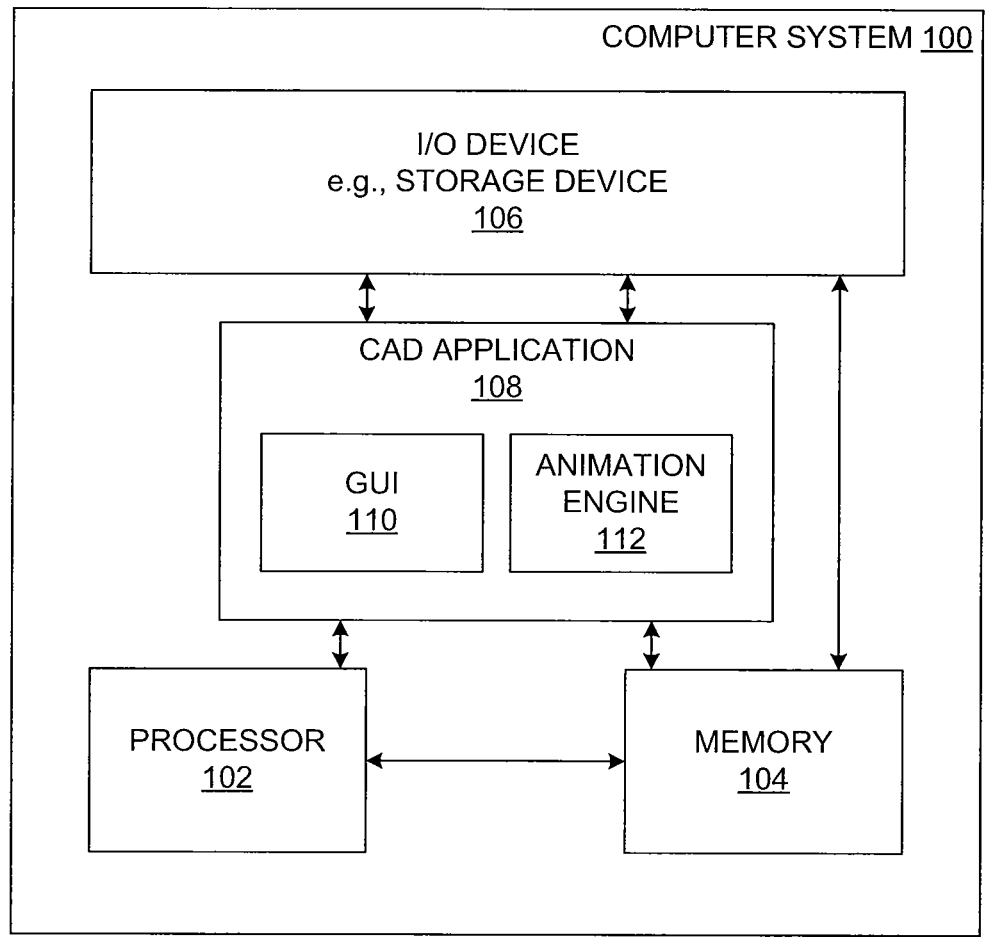
FIG. 1 is a block diagram of a system configured to implement one or more aspects of the invention.

FIG. 1 illustrates a conceptual block diagram of a general purpose computer system 100 configured to implement one or more aspects of the invention. As shown, computer system 100 includes processor 102 (e.g., a CPU), memory 104, e.g., random access memory (RAM) and/or read only memory (ROM), and various input/output devices 106, which may include storage devices including, but not limited to, a tape drive, a floppy drive, a hard disk drive or a compact disk drive, a receiver, a transmitter, a speaker, a display, a speech synthesizer, an output port, and a user input device such as a keyboard, a keypad, a mouse, and the like.

As shown in FIG. 1, computer system 100 is configured to execute CAD application 108, which includes a GUI 110 and an animation engine 112. As described in further detail herein, animation engine 112 is configured to automatically assign motions to objects (e.g., individuals) placed across a surface of a two-dimensional or a three-dimensional graphics object. In particular, and as described in further detail herein, animation engine 112 receives a graphics object of any shape or form—e.g., concave, convex, continuous, discontinuous—that includes at least one object placed on the surface of the graphics object. According to various embodiments, animation engine 112 is configured to animate the objects in a manner that promotes a natural diversity of motions and ensures that the animated objects do not collide with one another. In particular, animation engine 112 is configured to assign animations to objects based on whether they are alone or are part of a group. If an object is part of a group, animation engine 112 assigns to the object a talking animation or a listening animation depending on the animations assigned to other objects that are part of the group. Animation engine 112 is also configured to avoid assigning the same animation to two or more objects that are proximate to one another on the surface within a particular threshold. Animation engine 112 is further configured to avoid assigning animations to objects that would cause the object to collide with another object. Finally, animation engine 112 is configured to avoid assigning highly-noticeable animations to objects when there are less-noticeable animations that can be assigned to the objects.

Figure 2A:
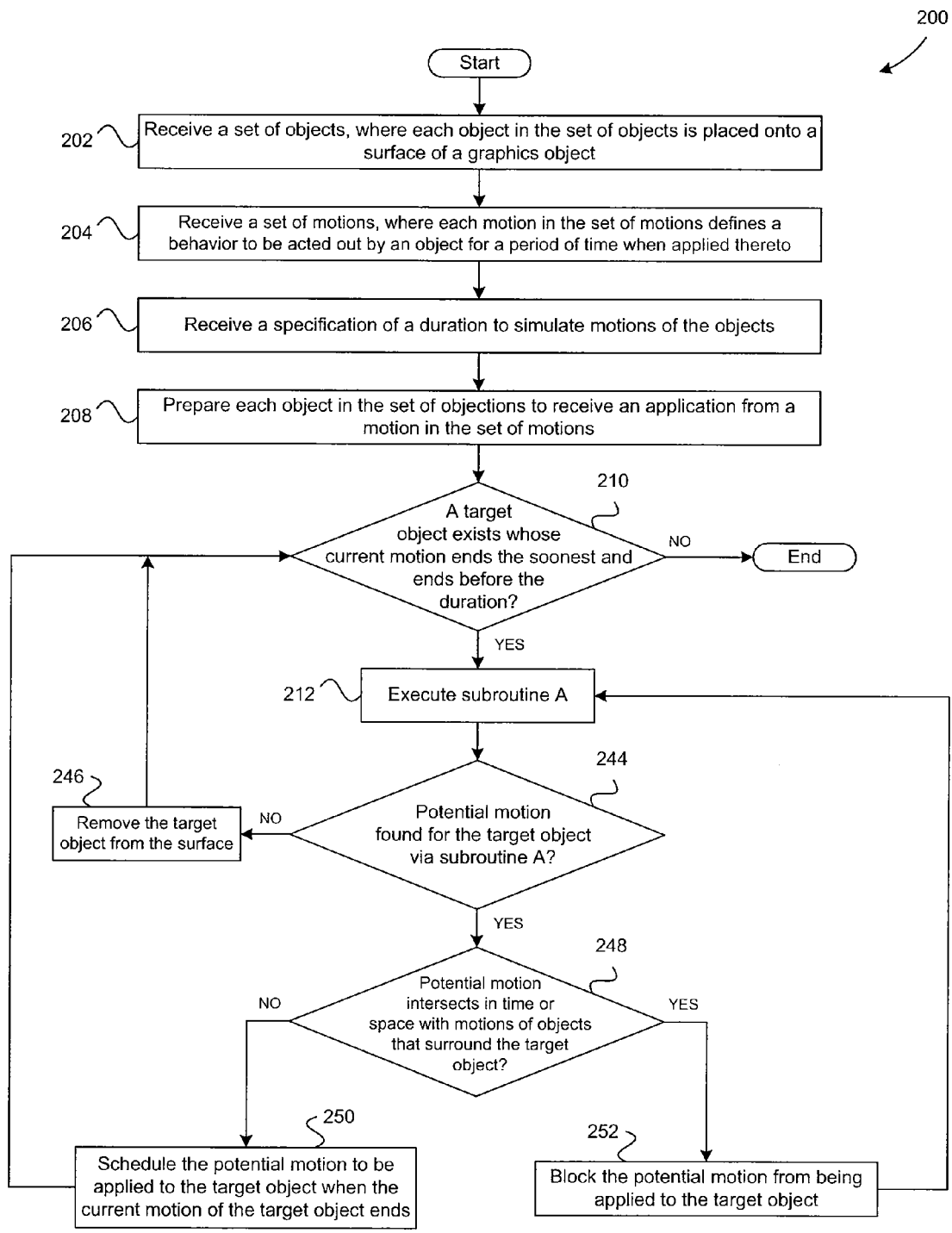
FIGS. 2A-2B illustrate a flow diagram of method steps for assigning collision-free motions to objects that are placed across a surface of a graphics object, according to one embodiment of the present invention.
Figure 2B:
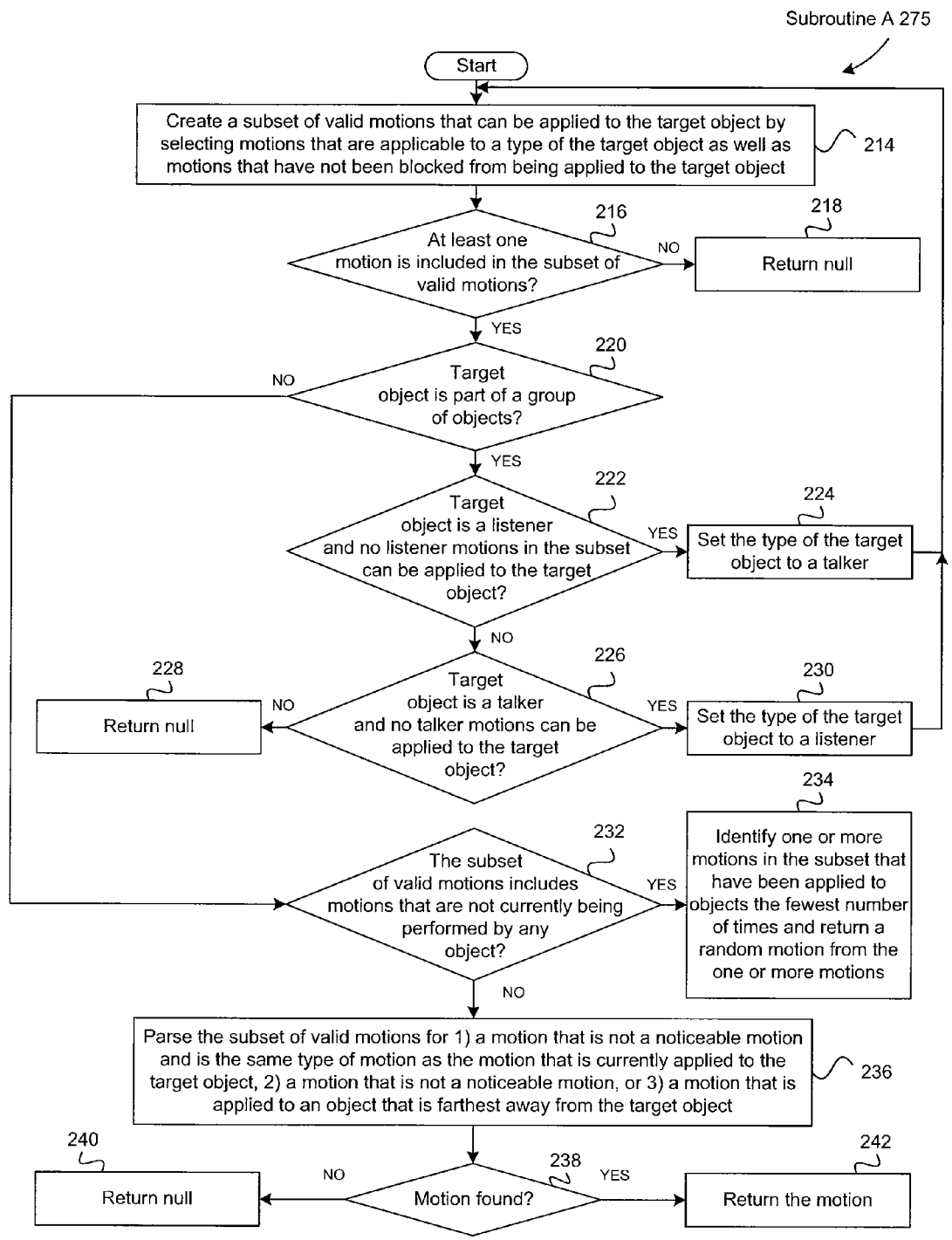

FIGS. 2A-2B illustrate a flow diagram of method steps for assigning collision-free motions to objects that are placed across a surface of a graphics object, according to one embodiment of the present invention. Although the method steps are described in conjunction with FIGS. 1 and 3A-3C, persons skilled in the art will understand that any system configured to perform the method steps, in any order, falls within the scope of the present invention.

As shown in FIG. 2A, method 200 begins at step 202, where animation engine 112 receives a set of objects that are placed onto a surface of a graphics object. At step 204, animation engine 112 receives a set of motions, where each motion in the set of motions defines a behavior to be acted out by an object for a period of time when applied thereto.

In one embodiment, each motion is implemented as a data object with various properties that are considered by animation engine 112 prior to assigning the motion to an object. One example of a property is a unique identifier for the motion, e.g., a string that is used to describe the motion, such as "texting" for a motion that causes an individual to simulate sending a text, or "phone call" for a motion that causes an individual to simulate a phone call. Another example of a property is a tag that indicates whether the motion should be applied to an object that has been set as a standalone object, a talker in a group, or a listener in a group. Yet another example of a property is a tag that indicates whether the motion is highly-noticeable. Yet another example of a property is a duration value that indicates the total duration of the animation.

Figure 3A:
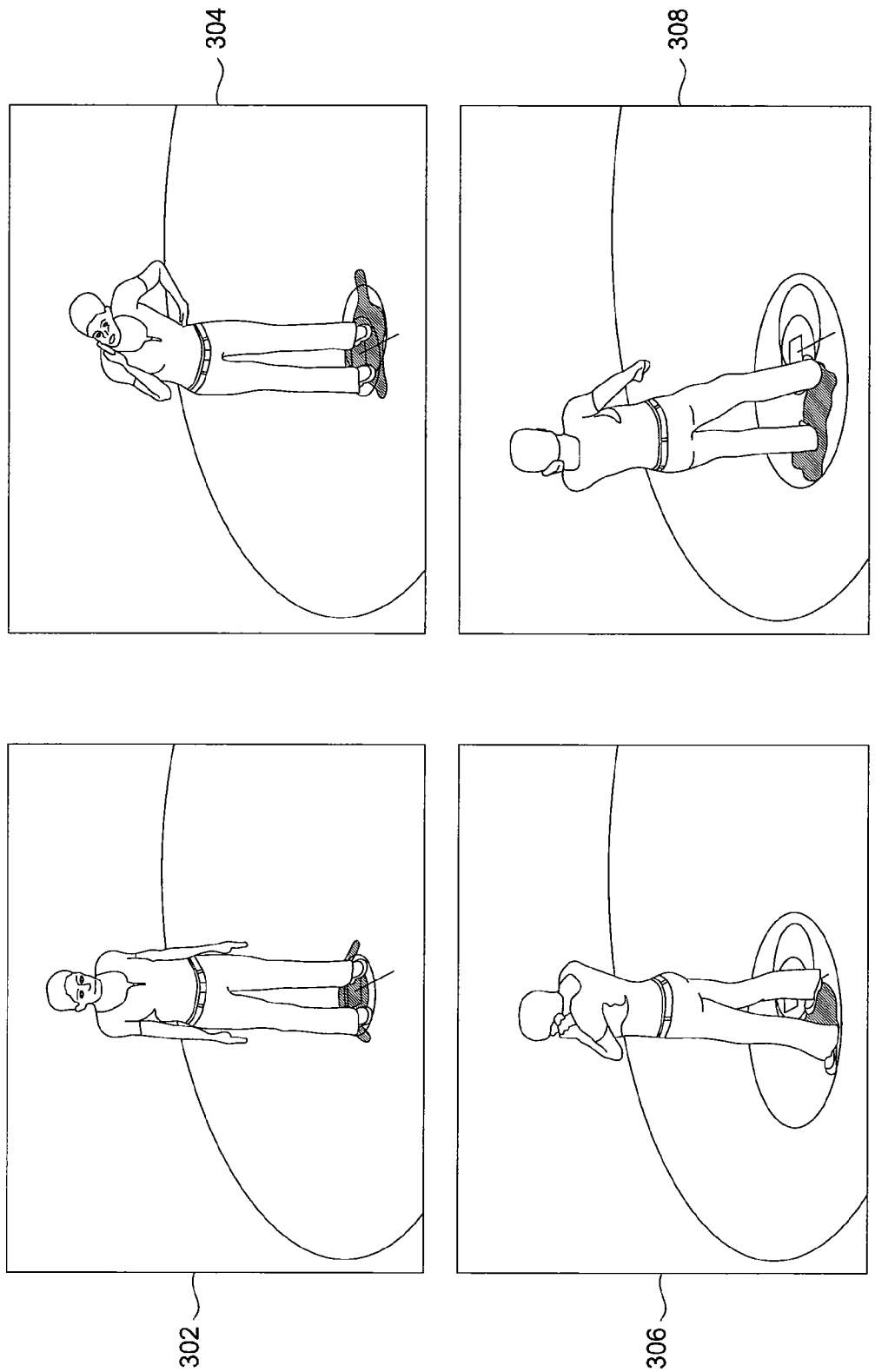
FIGS. 3A-3C are conceptual diagrams that illustrate the establishment of bounding areas for objects and groups of objects, according to one embodiment of the invention.
Figure 3B:
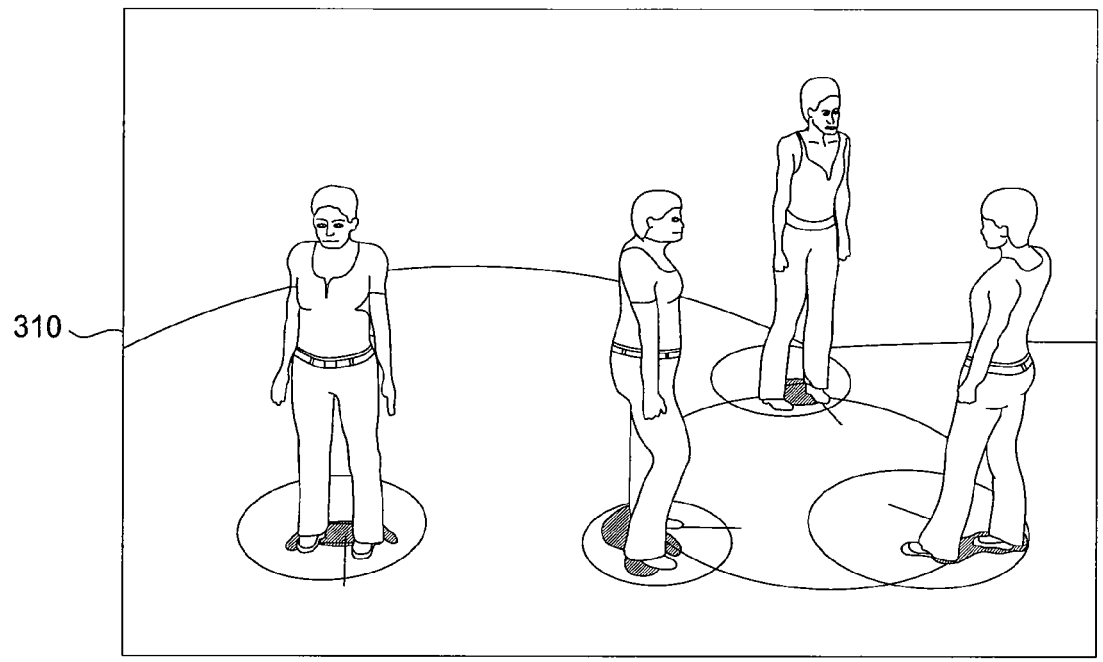
Figure 3B:
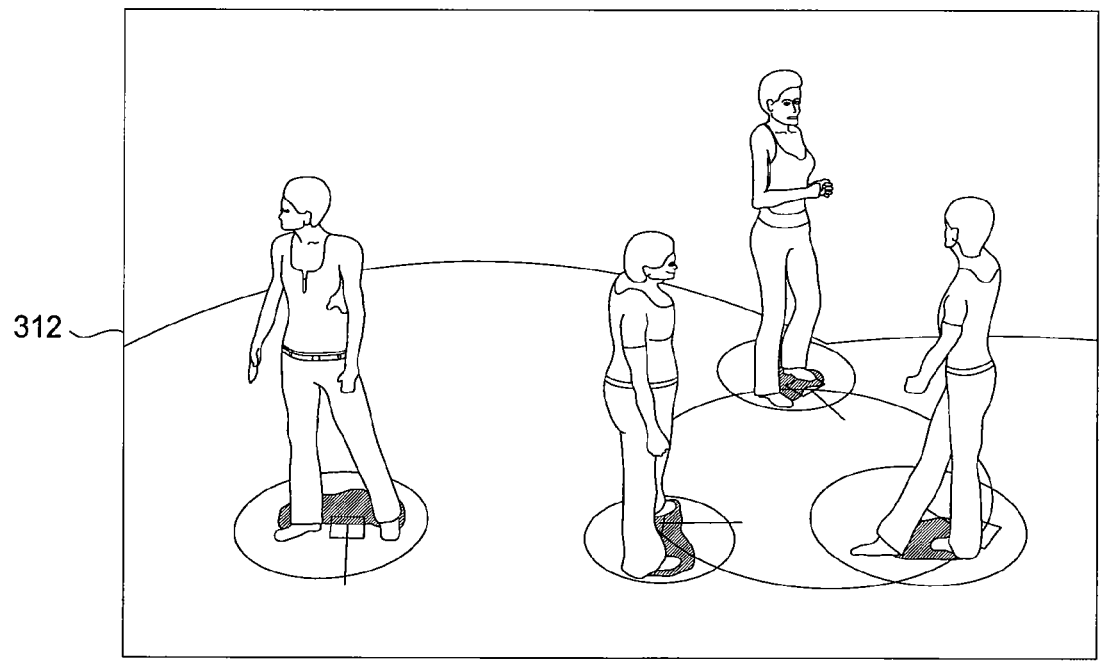
Figure 3C:
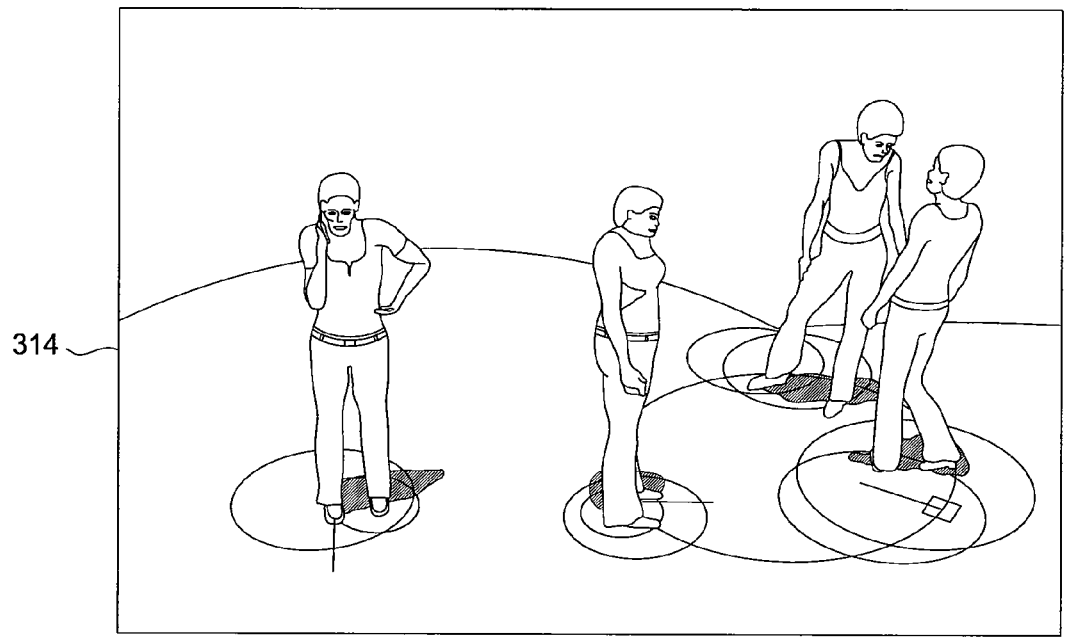
Figure 3C:
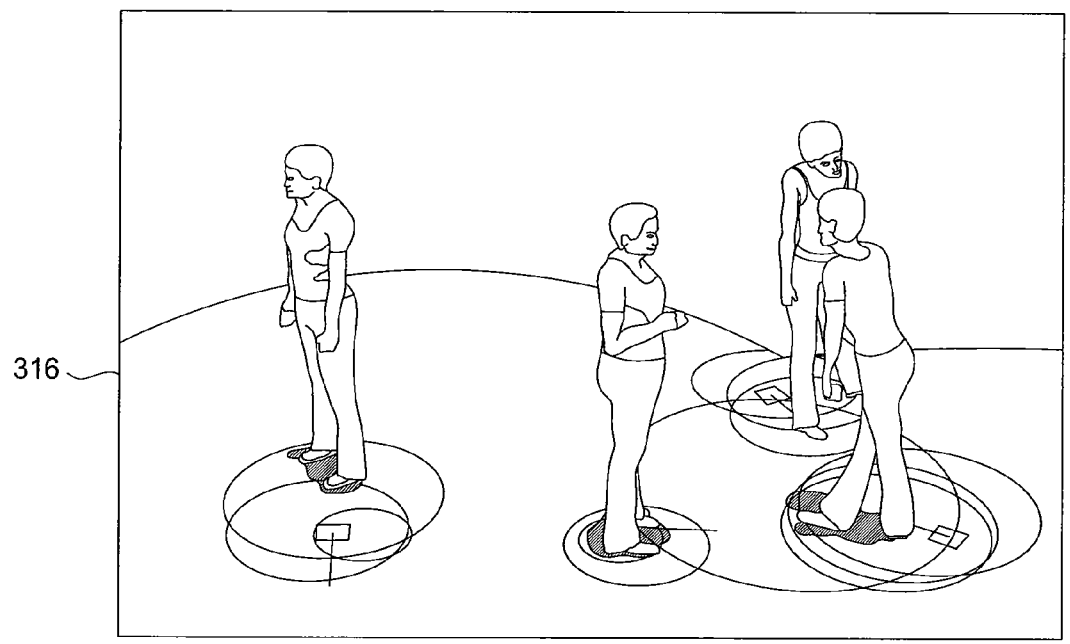

At step 206, animation engine 112 receives a specification of a duration to execute a simulation of animated objects. At step 208, animation engine 112 prepares each object in the set of objects for an application of a motion in the set of motions. As described in further detail herein, animation engine 112, when applying a motion to an object, calculates a bounding area around the object, where the calculated bounding area represents the largest area that is covered by the object when animated according to the motion assigned thereto. The calculated bounding area is then associated with the object such that it can be compared to the bounding areas of other objects in order to prevent assigning motions to objects that would cause the objects to collide with one another FIGS. 3A-3C illustrate examples of bounding areas that are calculated for both standalone objects and objects that are part of a group. For example, FIG. 3A includes example illustrations 302-308 of an object (i.e., a standalone individual) to which a cell-phone conversation motion is applied. In FIG. 3A, each different circle that lies beneath the individual represents a different motion that is applied to the individual throughout the animation. In particular, each circle is associated with a particular motion, an overall area that the individual covers when animated according to the motion, and a time segment that represents when the animation is applied to the individual during the simulation. In this way, animation engine 112 is able to analyze the movements of the objects within the simulation with respect to both time and space in order to prevent any of the objects from colliding with one another, the details of which are described below at step 248.

Similarly, FIGS. 3B-3C illustrate examples of a plurality of bounding areas that are calculated for both a standalone individual and a group of individuals that is nearby the standalone individual. As described above, these bounding areas are analyzed by animation engine 112 when assigning new motions to objects within the simulation so that no object collides with another object.

At step 210, animation engine 112 determines whether a target object exists whose current motion ends the soonest and ends before the specified duration. If, at step 210, animation engine 112 determines that no target object exists whose current motion ends the soonest and ends before the specified duration, then the simulation is complete, and method 200 ends. Otherwise, method 200 proceeds to step 212, where animation engine 112 executes subroutine A 275, which is illustrated in FIG. 2B.

At step 214, animation engine 112 creates a subset of valid motions that can be applied to the target object by selecting motions that are applicable to a type of the target object (e.g., a standalone object, a talker in a group, or a listener in a group) as well as motions that have not been blocked from being applied to the target object. At step 216, animation engine 112 determines whether at least one motion is included in the subset of valid motions. If, at step 216, animation engine 112 determines that the subset of valid motions is empty, then method 200 proceeds to step 218 and returns null, since there is not a valid motion that can be applied to the target object.

Otherwise, at step 220, animation engine 112 determines whether the target object is part of a group of objects. If so, method 200 proceeds to step 222, where animation engine 112 determines whether the target object is a listener and no listener motions in the subset can be applied to the target object. If, at step 222, animation engine 112 determines that the target object is a listener and no listener motions in the subset can be applied to the target object, then at step 224 animation engine 112 sets the type of the target object to a talker, and method 200 proceeds back to step 214 described above. In this way, the target object is converted to a talker, and animation engine 112 subsequently attempts to identify and assign valid talking motions to the target object according to steps 214-216 described above.

At step 226, animation engine 112 determines whether the target object is a talker and no talker motions can be applied to the target object. If so, method 200 proceeds to step 228, where animation engine 112 returns null since there is not a valid motion that can be applied to the target object. Otherwise, method 200 proceeds to step 230, where animation engine 112 sets the type of the target object to a listener. In this way, the target object is converted to a listener, and animation engine 112 subsequently attempts to identify and assign valid listening motions to the target object according to steps 214-216 described above.

Referring back now to step 220, if animation engine 112 determines that the target object is not part of a group of objects, i.e., the target object a standalone object, then method 200 proceeds to step 232, where animation engine 112 determines whether the subset of valid motions includes motions that are not currently being performed by any object in the set of objects. If, at step 232, animation engine 112 determines that the subset of valid motions includes motions that are not currently being performed by any object in the set of objects, then at step 234, animation engine 112 identifies one or more motions in the subset of motions that have been applied to objects the fewest number of times, and then returns a random motion from the one or more motions.

Otherwise, method 200 proceeds to step 236, where animation engine 112 parses the subset of valid motions for 1) a motion that is not a noticeable motion and is the same type of motion (such as texting, phoning, etc.) as the motion that is currently applied to the target object, 2) a motion that is not a noticeable motion, or 3) a motion that is applied to an object that is farthest away from the target object.

At step 238, animation engine 112 determines whether a motion according to 1), 2) or 3) in step 236 is found. If, at step 238, animation engine 112 identifies a motion in the subset of motions that meets the criteria of 1), 2) or 3) in step 236, then at step 242 animation engine 112 returns the motion. Otherwise, at step 240 animation engine 112 returns null, and method 200 returns to step 244 in FIG. 2A.

At step 244, animation engine 112 determines whether a potential motion is found for the target object via subroutine A. If, at step 244, animation engine 112 determines that a potential motion was not found for the target object via subroutine A, i.e., a null value was returned, then method 200 proceeds to step 246, where animation engine 112 removes the target object from the surface of the graphics object. Method 200 then returns to step 210, where animation engine 112 finds the next target object, if any, to which a new motion should be applied.

Referring back now to step 244, if animation engine 112 determines that a potential motion was found for the target object via subroutine A 275, then method 200 proceeds to step 248, where animation engine 112 determines whether the potential motion intersects with motions of objects that surround the target object. If, at step 248, animation engine 112 determines that the potential motion intersects with the motion of at least one other object, then method 200 proceeds to step 252, where animation engine 112 blocks the potential motion from being applied to the target object. Animation engine 112 then re-executes subroutine A 275 in order to identify the next potential motion, if any, to apply to the target object.

Referring back to step 248, if animation engine 112 determines that the potential motion does not intersect with the motion of other objects, then method 200 proceeds to step 250, where animation engine 112 schedules the potential motion to be applied to the target object when the current motion of the target object ends. Method 200 then returns back to step 210, and method steps 210-252 continue to execute so long as the duration of the simulation has not been reached and there exists at least one object whose animation ends before the simulation has completed.

In sum, embodiments of the invention set forth a technique that includes animating objects that are placed across a surface of a graphics object. A CAD application receives a set of motions and initially applies a different motion in the set of motions to each object placed across the surface of the graphics object. The CAD application calculates bounding areas of each object according to the current motion applied thereto, which are used by the CAD application to identify collisions that are occurring or will occur between the objects. A colliding object is cured by identifying valid motions in the set of motions that can be applied to the object and then calculating bounding areas for the valid motions until the discovery of a valid motion that, when applied to the object, does not cause the object to collide with any other objects that are placed across the surface of the graphics object.

One advantage of the disclosed technique is that objects placed across a surface of a graphics object are animated in a manner that promotes a natural diversity and flow of motions of the objects. The natural diversity is attained by avoiding the assignment of the same or similar motions to two objects that are proximate to one another beyond a particular threshold, by avoiding assignment of animations to objects that would cause the object to collide with another object, and by avoiding the assignment of highly-noticeable animations to objects when there are less-noticeable animations that can be assigned to the objects.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for animating, in a computer-generated simulation, a plurality of objects that are placed across a surface of a graphics object, the method comprising:
   receiving a specification of a total duration for the computer-generated simulation;
   applying, to a first object in the plurality of objects, a first motion from a set of motions;
   applying, to a second object in the plurality of objects, a second motion from the set of motions;
   establishing, for the first object, a first bounding area that represents a largest area covered by the first object when animated by the first motion;
   establishing, for the second object, a second bounding area that represents a largest area covered by the second object when animated by the second motion;
   determining that the first motion terminates prior to the total duration and prior to the second motion;

identifying a third motion in the set of motions that is a valid motion to be applied to the first object;
establishing a third bounding area for the first object based on the third motion;
determining that the third bounding area does not intersect with the second bounding area of the second object; and
scheduling, via a processor, the third motion to be applied to the first object when the first motion terminates.

2. The method of claim 1, further comprising blocking a fourth motion in the set of motions from being applied to the first object when the fourth motion is applied to another object in the plurality of objects that is proximate to the first object within a particular threshold, or would cause the first object to collide with another object in the plurality of objects.

3. The method of claim 2, wherein the third motion is a valid motion when the third motion is not blocked from being assigned to the first object and meets a type requirement of the first object.

4. The method of claim 3, wherein the third motion is chosen over a fifth motion that is a valid motion if the third motion is being applied to an object that is located furthest from the first object across the surface of the graphics object and the third motion is not a noticeable motion.

5. The method of claim 1, further comprising:
determining that the second object is part of a group of objects and that the second object is designated as a talker type, and that no valid motions in the set of motions can be applied to the talker type;
reclassifying the second object as a listener type;
identifying at least one valid motion in the set of motions that can be applied to the listener type; and
applying the at least one valid motion to the second object.

6. The method of claim 1, further comprising:
determining that the second object is part of a group of objects and that the second object is designated as a listener type, and that no valid motions in the set of motions can be applied to the listener type;
reclassifying the second object as a talker type;
identifying at least one valid motion in the set of motions that can be applied to the talker type; and
applying the at least one valid motion to the second object.

7. The method of claim 1, wherein the step of applying, to the first object and the second object, the first motion and the second motion, respectively, comprises:
selecting at random the first motion from the set of motions;
applying the first motion to the first object;
selecting at random the second motion from the set of motions; and
applying the second motion to the second object.

8. A non-transitory computer readable medium for storing instructions that, when executed by a processor, cause the processor to animate, in a computer-generated simulation, a plurality of objects that are placed across a surface of a graphics object, by performing the steps of:
applying, to a first object in the plurality of objects, a first motion from a set of motions;
applying, to a second object in the plurality of objects, a second motion from the set of motions;
establishing, for the first object, a first bounding area that represents a largest area covered by the first object when animated by the first motion;
establishing, for the second object, a second bounding area that represents a largest area covered by the second object when animated by the second motion;
identifying a third motion in the set of motions that is a valid motion to be applied to the first object;
establishing a third bounding area for the first object based on the third motion;
determining that the third bounding area does not intersect with the second bounding area of the second object; and
scheduling the third motion to be applied to the first object when the first motion terminates.

9. The non-transitory computer readable medium of claim 8, further comprising blocking a fourth motion in the set of motions from being applied to the first object when the fourth motion is applied to another object in the plurality of objects that is proximate to the first object within a particular threshold, or would cause the first object to collide with another object in the plurality of objects.

10. The non-transitory computer readable medium of claim 9, wherein the third motion is a valid motion when the third motion is not blocked from being assigned to the first object and meets a type requirement of the first object.

11. The non-transitory computer readable medium of claim 10, wherein the third motion is chosen over a fifth motion that is a valid motion if the third motion is being applied to an object that is located furthest from the first object across the surface of the graphics object and the third motion is not a noticeable motion.

12. The non-transitory computer readable medium of claim 8, further comprising:
determining that the second object is part of a group of objects and that the second object is designated as a talker type, and that no valid motions in the set of motions can be applied to the talker type;
reclassifying the second object as a listener type;
identifying at least one valid motion in the set of motions that can be applied to the listener type; and
applying the at least one valid motion to the second object.

13. The non-transitory computer readable medium of claim 8, further comprising:
determining that the second object is part of a group of objects and that the second object is designated as a listener type, and that no valid motions in the set of motions can be applied to the listener type;
reclassifying the second object as a talker type;
identifying at least one valid motion in the set of motions that can be applied to the talker type; and
applying the at least one valid motion to the second object.

14. The non-transitory computer readable medium of claim 8, wherein the step of applying, to the first object and the second object, the first motion and the second motion, respectively, comprises:
selecting at random the first motion from the set of motions;
applying the first motion to the first object;
selecting at random the second motion from the set of motions; and
applying the second motion to the second object.

15. A computer system, comprising:
a memory storing a computer-aided design (CAD) application; and
a processor that is coupled to the memory and, upon executing the CAD application, is configured to animate, in a computer-generated simulation, a plurality of objects that are placed across a surface of a graphics object, by performing the steps of:
applying, to a first object in the plurality of objects, a first motion from a set of motions;
applying, to a second object in the plurality of objects, a second motion from the set of motions;

establishing, for the first object, a first bounding area that represents a largest area covered by the first object when animated by the first motion;

establishing, for the second object, a second bounding area that represents a largest area covered by the second object when animated by the second motion;

establishing a third bounding area for the first object based on a third motion;

determining that the third bounding area does not intersect with the second bounding area of the second object; and scheduling the third motion to be applied to the first object when the first motion terminates.

16. The system of claim 15, wherein the processor further performs the step of blocking a fourth motion in the set of motions from being applied to the first object when the fourth motion is applied to another object in the plurality of objects that is proximate to the first object within a particular threshold, or would cause the first object to collide with another object in the plurality of objects.

17. The system of claim 16, wherein the third motion is a valid motion when the third motion is not blocked from being assigned to the first object and meets a type requirement of the first object.

18. The system of claim 17, wherein the third motion is chosen over a fifth motion that is a valid motion if the third motion is being applied to an object that is located furthest from the first object across the surface of the graphics object and the third motion is not a noticeable motion.

19. The system of claim 15, wherein the processor further performs the steps of:
   determining that the second object is part of a group of objects and that the second object is designated as a talker type, and that no valid motions in the set of motions can be applied to the talker type;
   reclassifying the second object as a listener type;
   identifying at least one valid motion in the set of motions that can be applied to the listener type; and
   applying the at least one valid motion to the second object.

20. The system of claim 15, wherein the processor further performs the steps of:
   determining that the second object is part of a group of objects and that the second object is designated as a listener type, and that no valid motions in the set of motions can be applied to the listener type;
   reclassifying the second object as a talker type;
   identifying at least one valid motion in the set of motions that can be applied to the talker type; and
   applying the at least one valid motion to the second object.

\* \* \* \* \*